(12) United States Patent
Fries

(10) Patent No.: US 12,471,738 B2
(45) Date of Patent: Nov. 18, 2025

(54) ADJUSTABLE SPICE MILL

(71) Applicant: JOMA KUNSTSTOFFTECHNIK GMBH, Brunn am Gebirge (AT)

(72) Inventor: Rudolf Fries, Kaumberg (AT)

(73) Assignee: JOMA KUNSTSTOFFTECHNIK GMBH, Brunn am Gebirge (AT)

( * ) Notice: Subject to any disclaimer, the term of this patent is extended or adjusted under 35 U.S.C. 154(b) by 178 days.

(21) Appl. No.: 17/917,586

(22) PCT Filed: Apr. 9, 2021

(86) PCT No.: PCT/AT2021/060119
§ 371 (c)(1),
(2) Date: Oct. 7, 2022

(87) PCT Pub. No.: WO2021/203156
PCT Pub. Date: Oct. 14, 2021

(65) Prior Publication Data
US 2023/0142361 A1    May 11, 2023

(30) Foreign Application Priority Data
Apr. 9, 2020  (AT) .............................. A 50308/2020

(51) Int. Cl.
*A47J 42/08*  (2006.01)
*A47J 42/04*  (2006.01)
*A47J 42/40*  (2006.01)

(52) U.S. Cl.
CPC ................ *A47J 42/08* (2013.01); *A47J 42/40* (2013.01)

(58) Field of Classification Search
CPC ............. A47J 42/08; A47J 42/40; A47J 42/04
See application file for complete search history.

(56) References Cited

U.S. PATENT DOCUMENTS 10,912,416 B2 * 2/2021 Carapelli ................ A47J 42/10
2004/0182958 A1   9/2004 Herren
(Continued)

FOREIGN PATENT DOCUMENTS

EP   1459665 A1   9/2004
EP   2 454 978 A1   5/2012
(Continued)

OTHER PUBLICATIONS

English translation of the International Preliminary Report on Patentability, issued in International Patent Application No. PCT/AT2021/060119, date of mailing Oct. 13, 2022.
(Continued)

*Primary Examiner* — Mohammed S. Alawadi
(74) *Attorney, Agent, or Firm* — GREENBLUM & BERNSTEIN, P.L.C.

(57) ABSTRACT

A spice mill having a container and having a grinder which includes a stator connected to the container, in which a position of the stator, when connected, is substantially defined in the direction of a longitudinal axis of the grinder relative to the container; an actuator, which has a rotor arranged at least in portions within the stator and is mounted rotatably relative to the stator. The rotor is connected for conjoint rotation to an actuating element and the actuating element is rotatably connected to an adjusting element and is secured in the direction of the longitudinal axis. The adjusting element has a thread by which it can be connected to the container such that the position of the rotor is adjustable in the direction of the longitudinal axis by a rotation of the adjusting element relative to the container.

13 Claims, 6 Drawing Sheets

(56) References Cited

U.S. PATENT DOCUMENTS

| | | |
|---|---|---|
| 2006/0192043 A1 | 8/2006 | Fornage |
| 2006/0278746 A1 | 12/2006 | Delbridge et al. |
| 2017/0095121 A1 | 4/2017 | Carapelli |
| 2021/0204756 A1* | 7/2021 | Tang ........................ A47J 42/08 |
| 2022/0175189 A1* | 6/2022 | Davidson ................ A47J 42/08 |

FOREIGN PATENT DOCUMENTS

| | | |
|---|---|---|
| FR | 2 857 842 A1 | 1/2005 |
| WO | 2005/046411 A1 | 5/2005 |
| WO | 2015/181712 A1 | 12/2015 |

OTHER PUBLICATIONS

International Search Report issued in International Patent Application No. PCT/AT2021/060119, dated Jun. 14, 2021, along with an English translation thereof.

Written Opinion of the International Searching Authority issued in International Patent Application No. PCT/AT2021/060119, dated Jun. 14, 2021.

* cited by examiner

ADJUSTABLE SPICE MILL

The invention relates to a spice mill with a container and with a grinder, which comprises the following: a stator, wherein the stator can be connected to the container and the position of the stator in the connected state is substantially defined in the direction of a longitudinal axis of the grinder relative to the container, an actuating unit, which comprises a rotor, wherein the rotor, at least in sections, is arranged within the stator and is mounted rotatably relative to the stator, wherein the rotor is connected to an actuating element for conjoint rotation.

In such spice mills, a grinding gap is formed between an outer surface of the rotor and an inner surface of the stator, in which the material that is to be ground is ground by means of a relative rotation between the rotor and stator. The relevant surfaces of the stator and rotor can be configured differently, and can, for example, comprise teeth, between which the material that is to be ground is ground. Here the fineness of grinding of the grinder is determined by the distance between the surfaces of the stator and rotor. In order to grind the material that is to be ground, the actuating element of the actuating unit is rotated, and the rotation is transmitted onto the rotor, which then crushes the material that is to be ground in an interaction with the stator. Such spice mills mainly find application as pre-filled spice mills, especially disposable mills.

A spice mill of this type is already of known art from EP 2 454 978 A1, in which a grinder is snapped onto a container, wherein it is advantageously possible to adjust the fineness of grinding in two stages. To adjust the fineness of grinding, the grinder has a projecting rib on the stator, by way of which the rotor can be arranged in different axial positions. To adjust the fineness of grinding, an actuating element connected to the rotor for conjoint rotation can be displaced in the longitudinal direction of the mill, such that the relative position of the rotor with respect to the stator, and thus the fineness of grinding, is adjusted at the same time by way of the longitudinal displacement of the actuating element. In order to position the rotor in an upper coarse grinding position, a circumferential rib is provided on the container, against which projecting lugs abut in an end position.

Another grinder is of known art from WO 2015/181712 A1, which can be snapped onto a container and which provides for an adjustment of the fineness of grinding in two stages. To adjust the fineness of grinding, the grinder comprises a projecting rib on the stator, which can engage in two different grooves on the rotor of the grinder. The grooves are offset from each other in the axial direction. To adjust the fineness of grinding, the rib is displaced from one groove to the other. This displacement alters the distance between the stator and the rotor, on which the grinding surfaces are conically arranged. This allows the fineness of grinding to be adjusted.

WO 2005/046411 A1 also shows a grinder that enables the fineness of grinding to be adjusted by axial adjustment of the rotor relative to the stator. For this purpose, grooves are also arranged axially offset from each other on the rotating part, and a circumferential projection is provided on the stator for purposes of engagement in these grooves. The fineness of grinding is also adjusted here by a longitudinal displacement of the circumferential projection from one groove into the other. The grinder also has a thread for purposes of screwing the latter onto a container.

The disadvantage of these adjustment mechanisms is that the force required to adjust them, especially when pulling them apart, is not always smooth. In addition, it is difficult for the user to see in which grinding position the grinder is located.

It is the object of the invention to alleviate these disadvantages of the prior art at least partially, or to eliminate them entirely. In particular, it is the object of the invention to create a spice mill and a grinder, in which the fineness of grinding can be adjusted in a simple and user-friendly manner.

This object is achieved by a spice mill with the features of claim 1, and by a grinder with the features of claim 15.

In accordance with the invention, the actuating element is rotatably connected to an adjusting element, and is secured in the direction of the longitudinal axis, wherein the adjusting element comprises a thread with which it can be connected to the container, such that the position of the rotor in the direction of the longitudinal axis can be adjusted by means of a rotation of the adjusting element relative to the container. This makes it possible to dispense with circumferential grooves spaced apart from one another in the longitudinal direction, each of which defines a specific fineness of grinding. In contrast, a smooth and precise adjustment of the fineness of grinding is made possible, since, with an appropriate design of the pitch of the thread, a suitable translation of the rotational movement of the adjusting element into a linear movement of the actuating unit, and thus of the rotor, is achieved.

At the same time, a desired fineness of grinding can be selected from a continuous spectrum of finenesses, or a plurality of, preferably at least two, predefined positions of the adjusting element, and thus of the rotor, can be determined. The grinder can be secured against a complete unscrewing of the adjusting element from the container.

For a simpler and more secure fastening of the grinder to the container, the container comprises a thread that mates with the thread of the adjusting element.

The mating thread of the container preferably comprises the same pitch as the thread of the adjusting element. This ensures that the screwing-on of the grinder, and the adjustment of the fineness of grinding, functions smoothly.

In one form of embodiment, the adjusting element and the container comprise interacting anti-reverse rotation elements, such that an adjusting element screwed onto the container cannot be detached from the container without being destroyed. The anti-reverse rotation elements are preferably arranged on the container and on the adjusting element such that the adjusting element can be rotated within a defined range when connected to the container. On the one hand, the anti-reverse rotation elements make it possible to produce the mill as a disposable spice mill, in which the grinder can be screwed onto the container and does not have to be plugged on. On the other hand, the anti-reverse rotation elements can be used to define a range within which the fineness of grinding can be adjusted. This prevents the fineness of grinding from being set too coarsely, for example. The anti-reverse rotation elements also prevent the adjusting element from being inadvertently unscrewed from the container.

In a further form of embodiment, the container can comprise a ramp-shaped projection with a run-up surface and a balking surface as the anti-reverse rotation element, and the adjusting element can comprise a spring element projecting in the direction of the container as the anti-reverse rotation element, wherein when the adjusting element is screwed onto the container, the spring element is elastically deformed over the run-up surface and slides over the projection, such that the spring element bears against the balking surface in a balking manner in the event of a rotational movement counter to the screwing-on direction. This form of embodiment enables a simple and non-destructive screwing of the grinder onto the container in the course of the manufacture of the mill. At the same time, the balking surfaces enable any rotation counter to the screwing-on direction to be prevented in the connected state. The balking by the balking surfaces of the anti-reverse rotation elements can only be overcome with considerable force and with the destruction of the spring elements of the adjusting element.

On an inner face the adjusting element preferably comprises at least one cam projecting inwards in the direction of the container. The cam can preferably be arranged just underneath the thread of the adjusting element. With an appropriate design of the container, the cam can engage in structures provided for this purpose, and can thus prevent or impede a rotation of the adjusting element in a certain direction. In this manner, for example, a maximum screwing-on depth can be set, or the adjusting element can be positioned in a latching manner in different positions relative to the container.

At least one outwardly projecting cam is advantageously provided on an outer face of the container, preferably directly adjacent to a flank of the mating thread. Since the axial position of the cam of the adjusting element alters relative to the container as the adjusting element is rotated on the container, the ability of the adjusting element to rotate relative to the container can be limited by a targeted impact of a cam of the adjusting element on a cam of the container, and in this manner a position of the adjusting element can be defined, with which a defined fineness of grinding is set. The sizes and/or shapes of the two cams are advantageously adjusted with respect to each other such that when an increased rotational force is applied, an elastic deformation occurs, in particular of the adjusting element, such that the cam of the adjusting element can slide over the cam of the container and thus, after a snap-over, the adjusting element can be rotated further.

At least two cams, arranged at a distance from each other in the screwing-on direction, are advantageously provided on an outer face of the container. In this form of embodiment, one of the two cams is arranged adjacent to the run-up surface of the anti-reverse rotation element, such that a kind of recess is formed between this cam and the anti-reverse rotation element, which recess is wide enough for the cam of the adjusting element to be accommodated therein. The second cam of the container is arranged at a certain distance from the first cam, on the side of the first cam that is opposite the anti-reverse rotation element. The two cams on the container make it possible to fix the adjusting element in two different positions on the container, counter to a rotation in a certain direction. In this manner, two previously defined finenesses of grinding can be set, wherein the difference between the two finenesses of grinding is determined by the distance between the two cams on the container.

The at least one cam of the adjusting element preferably bears against a cam of the container in a first rotational orientation of the adjusting element, wherein the adjusting element is elastically deformable when an increased rotational force is applied, such that the cam of the adjusting element can move over the cam of the container. In this rotational orientation of the adjusting element, the cam of the adjusting element is preferably located in the recess between the first cam and the run-up surface of the anti-reverse rotation element of the container. By this means the adjusting element can be prevented from rotating relative to the container up to a certain rotational force, and thus a defined fineness of grinding can be set. By virtue of the elastic deformability, the cam of the adjusting element can be moved over the cams of the container by the application of an increased rotational force. This makes it possible to move the adjusting element into a further position and thus alter the fineness of grinding.

In a further form of embodiment, in a second rotational orientation of the adjusting element, the cam of the adjusting element bears against the second cam of the container, and the anti-reverse rotation elements bear against each other. In this form of embodiment, the anti-reverse rotation element and the two cams of the container are preferably located between the anti-reverse rotation element and the cam of the adjusting element. In this rotational orientation, a rotation of the adjusting element relative to the container is prevented until an increased rotational force is applied, and thus a second predefined fineness of grinding is set. The distance between the anti-reverse rotation element and the cam on the adjusting element and the distance between the anti-reverse rotation element and the second cam on the container are therefore advantageously matched. The rotational path between the two adjustable finenesses of grinding is thus determined by the distance between the first and the second cam on the container.

The container and the adjusting element each preferably comprise a pair of cams associated with a rotational orientation, wherein cams of the container and the adjusting element, in each case arranged diametrically opposed, interact. The diametrical arrangement of the interacting cams of a pair of cams increases the security against an inadvertent adjustment of the fineness of grinding. When the cams of the adjusting element move over the cams of the container, the wall of the adjusting element is pushed outwards at the location of cams. If this happens at diametrically opposite points, it is ensured that the entire adjusting element does not assume a displaced position, but rather that the adjusting element remains arranged centred on the container by virtue of the diametrically acting restoring forces.

Furthermore, it is advantageous if the container comprises a circumferential snap-on groove in an upper end section adjacent to an upper container opening. In particular, this snap-on groove makes it possible to attach the stator to the container in a simple manner, and to secure it against axial movement, in particular in the event of an axial displacement of the actuating element and rotor.

It is furthermore advantageous if the stator preferably comprises a plurality of snap-on hooks distributed over the circumference for purposes of connecting to the snap-on groove of the container. This form of embodiment enables the stator to be attached to the container independently of the other parts of the grinder. This separate attachment mechanism allows the stator to be mechanically attached to the container separately from the rotor and the connecting element. The stator is secured against axial movement relative to the container by the snap-on hooks, which preferably connect to the snap-on groove. The axial position of the stator relative to the container is thus not affected by a rotation of the adjusting element, and a rotation or axial displacement of the actuating unit.

In a particular form of embodiment, the container comprises projections adjacent to the upper container opening; a plurality of projections are preferably distributed over the circumference. The projections make it possible, in particular, to secure a stator placed on the container against rotation.

In this context, it is advantageous if the stator comprises projections, preferably a plurality of projections distributed over the circumference, for purposes of interacting with the projections of the container. In the state in which the stator is connected to the container, the projections of the stator are arranged between the projections of the container. In this manner, the side surfaces of the projections of the container form stops for the projections of the stator, such that the range of rotational movement of the stator is substantially limited to the distance between two adjacent projections of the stator. When the actuating part is rotated, a rotational force is exerted on the stator by the rotor by way of the material that is to be ground. Without an anti-rotation device, the stator could at best spin, and any grinding would only be possible to a limited extent. By limiting the rotational movement of the stator, the latter is stopped in one position, and a relative movement between stator and rotor, which is necessary for the grinding of the material that is to be ground, is made possible.

The above-described object is also achieved by a grinder for a spice mill, in accordance with one of the above forms of embodiment, or a combination of these forms of embodiment, with a stator, wherein the stator can be connected to a container, and the position of the stator in the connected state is substantially defined in the direction of a longitudinal axis of the grinder relative to the container, and with an actuating unit, which comprises a rotor, wherein the rotor, at least in sections, is arranged within the stator, and is rotatably mounted relative to the stator, wherein the rotor is connected to an actuating element for conjoint rotation.

In accordance with the invention, the actuating element is here rotatably connected to an adjusting element, and is secured in the direction of the longitudinal axis, wherein the adjusting element comprises a thread, with which it can be connected to a container, such that the position of the rotor in the direction of the longitudinal axis can be adjusted by means of a rotation of the adjusting element relative to a container. With the inventive design, a rotation of the adjusting element is in particular decoupled from a rotation of the actuating unit. Thus, the material that is to be ground can be ground by a rotation of the actuating part, without thereby moving the adjusting element at the same time, and thereby altering the fineness of grinding. In addition, a rotational movement of the adjusting element can be converted into an axial movement of the actuating unit, such that a rotation of the adjusting element relative to a container moves the rotor relative to the stator in the longitudinal direction, and thus adjusts the fineness of grinding.

The adjusting element and the actuating element are preferably connected to each other by way of a tongue-groove connection. This enables a particularly simple connection of the actuating unit to the adjusting element by snapping into place the tongue-groove connection in the course of the manufacture of the grinder. At the same time, this tongue-groove connection ensures that the adjusting element and the actuating unit are rotatably connected, and are secured in the direction of the longitudinal axis.

In what follows, a particular form of embodiment of the invention is described in detail with reference to figures, wherein the invention is not intended to be limited to this form of embodiment.

Figure 1:
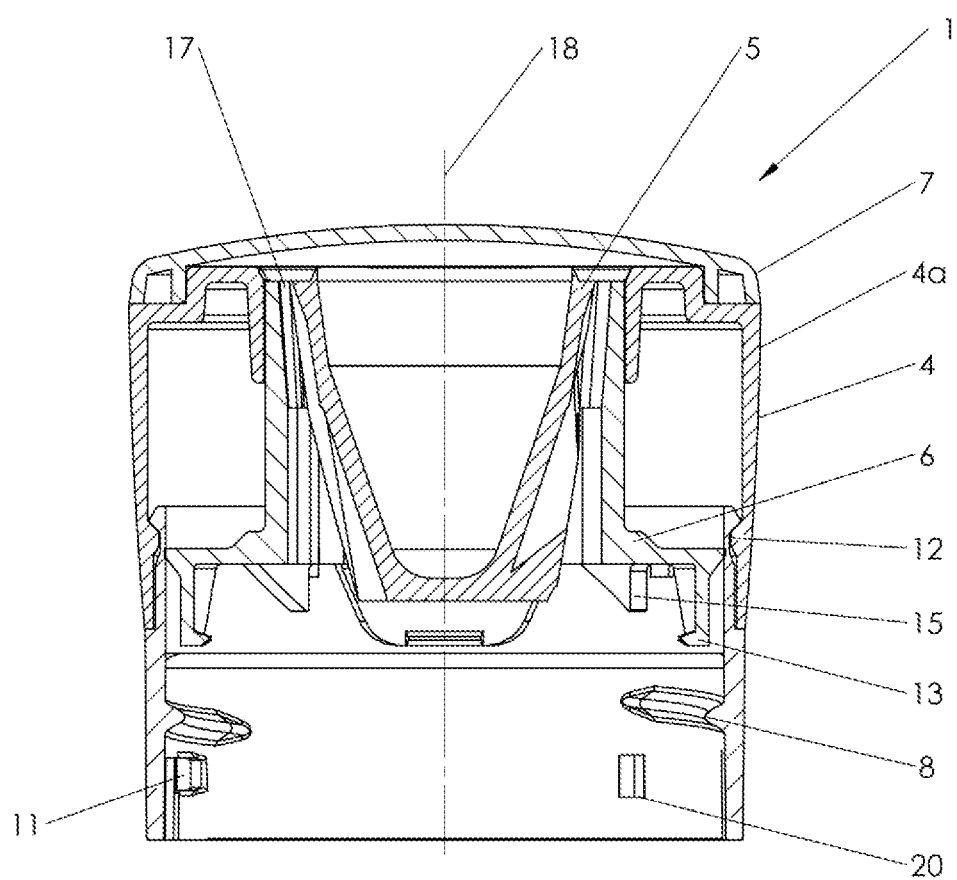
FIG. 1 shows schematically a sectional view of a form of embodiment of a grinder in accordance with the invention.

FIG. 1 shows a grinder 1 of a spice mill 2 (FIGS. 5, 6), which comprises an adjusting element 3, an actuating unit 4, which includes a rotor 5 and an actuating element 4*a*, and a stator 6. The rotor 5 is fixedly connected to, or integrally designed with, the actuating element 4*a*, such that a movement of the actuating element 4*a* is transferred directly onto the rotor 5. A cover 7 is placed on the actuating unit 4, which can be removed in a simple manner from the actuating unit 4 when the latter is in use.

Figure 2:
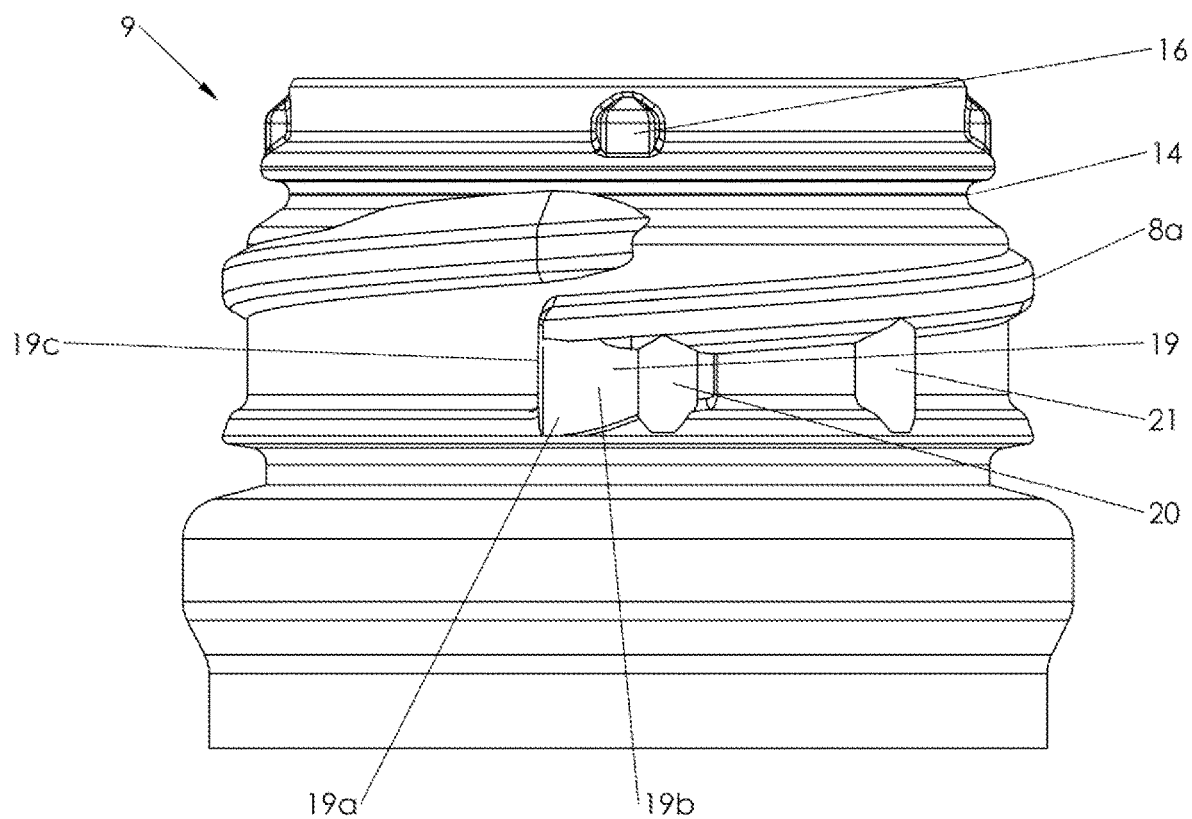
FIG. 2 shows schematically, in a side view, a form of embodiment of the upper section of container of a spice mill in accordance with the invention.

The adjusting element 3 comprises a thread 8, with which it can be screwed onto a container 9 (FIG. 2). Furthermore, cams 10 and anti-reverse rotation elements 11 are attached to an inner surface of a substantially cylindrical jacket section of the adjusting element 3, wherein only one cam 10 and one anti-reverse rotation element 11 are visible in the view shown.

The adjusting element 3 is connected to the actuating unit 4 by way of a tongue-groove connection 12, such that these can rotate and are securely connected to each other in the direction of a longitudinal axis 18. By a rotation of the adjusting element 3 on the container 9, its position alters in the direction of the longitudinal axis 18, that is to say, in the axial direction. This alteration in position in the axial direction is transferred by way of the tongue-groove connection 12 onto the actuating element 4*a*, and thus onto the rotor 5.

The stator 6 preferably comprises a plurality of snap-on hooks 13 arranged in a distributed manner over the circumference, for purposes of connecting to a snap-on groove 14 of the container 9. By means of the snap-on hooks 13, the stator 6 is connected to the container 9 in a substantially axially-immovable manner. In order to prevent rotation of the stator 6 on the container 9, projections 15 are provided, which interact with projections 16 of the container (FIG. 2), and thus limit a rotational movement of the stator 6 relative to the container 9.

A grinding gap 17 is formed between the stator 6 and the rotor 5. Since the stator 6 is connected to the container 9 by way of the snap-on hooks 13 in a substantially immovable manner in the direction of the longitudinal axis 18, a relative movement occurs between the rotor 5 and the stator 6 in the direction of the longitudinal axis 18 when the adjusting element 3 is rotated. By virtue of the conical shape of the rotor 5, the relative axial movement between the rotor 5 and the stator 6 results in an alteration in the width of the grinding gap 17, and thus in the fineness of grinding.

FIG. 2 shows the upper section of the container 9, in which projections 16 are arranged adjacent to the upper container opening, and are distributed over the circumference. In the form of embodiment shown, there are four such projections 16 present, while only three are visible. Below the projections 16, the container 9 comprises a circumferential snap-on groove 14, which is provided for purposes of connecting to the snap-on hooks 13, of which a plurality are preferably arranged in a distributed manner over the circumference of the stator 6. Below the snap-on groove 14, the container 9 has a mating thread 8a, which is provided for purposes of screwing on the adjusting element 3 by way of the thread 8, and for purposes of adjusting the fineness of grinding by way of the adjusting element 3.

Below the mating thread 8a are arranged an anti-reverse rotation element 19 of the container 9, a first cam 20 and a second cam 21. As can be seen in FIG. 2, the anti-reverse rotation element 19, the first cam 20, and the second cam 21, are directly adjacent to the lower flank of the mating thread 8a of the container 9. The anti-reverse rotation element 19 of the container 9 is designed as a ramp-shaped projection 19a, with a run-up surface 19b and a balking surface 19c.

Figure 3:
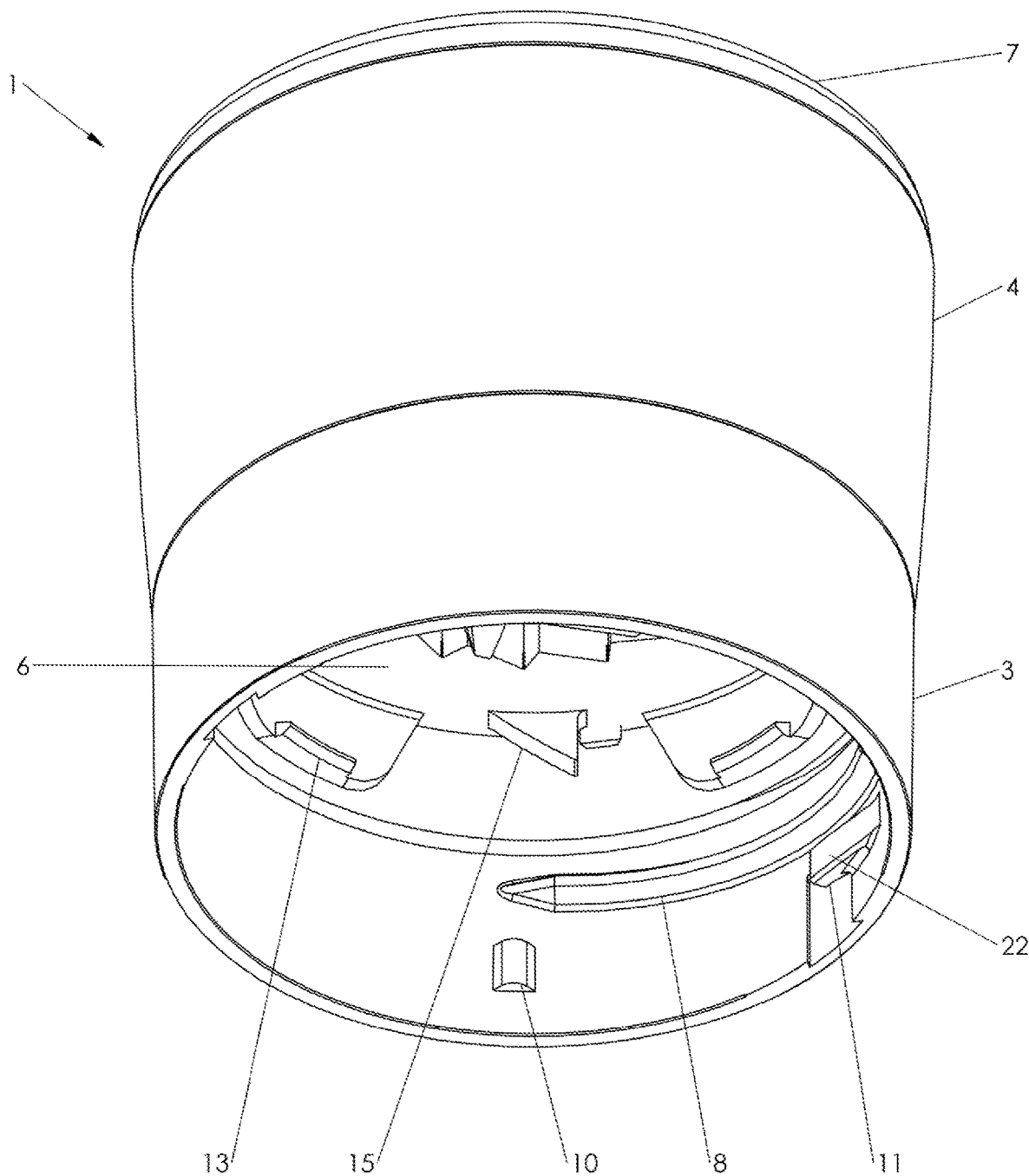
FIG. 3 shows schematically, in an oblique view from below, the form of embodiment in accordance with FIG. 1.

FIG. 3 shows the grinder 1 obliquely from below. The cover 7 is placed on top of the actuating unit 4. The actuating unit 4 is connected to the adjusting element 3 by way of the tongue-groove connection 12 shown in FIG. 1. On the inner face of the adjusting element 3 can be seen the cam 10, the thread 8, and the anti-reverse rotation element 11, which is designed as a spring element 22 projecting in the direction of the container 9. When the adjusting element 3 is screwed onto the container 9, the spring element 22 is elastically deformed by way of the run-up surface 19b, and slides over the projection 19a of the anti-reverse rotation element 19 of the container 9 (see FIGS. 2, 7 and 8). In the connected state of the adjusting element 3 and the container 9, the spring element 22 bears against the balking surface 19c in a balking manner in the course of a rotational movement counter to the screwing-on direction.

Figure 4:
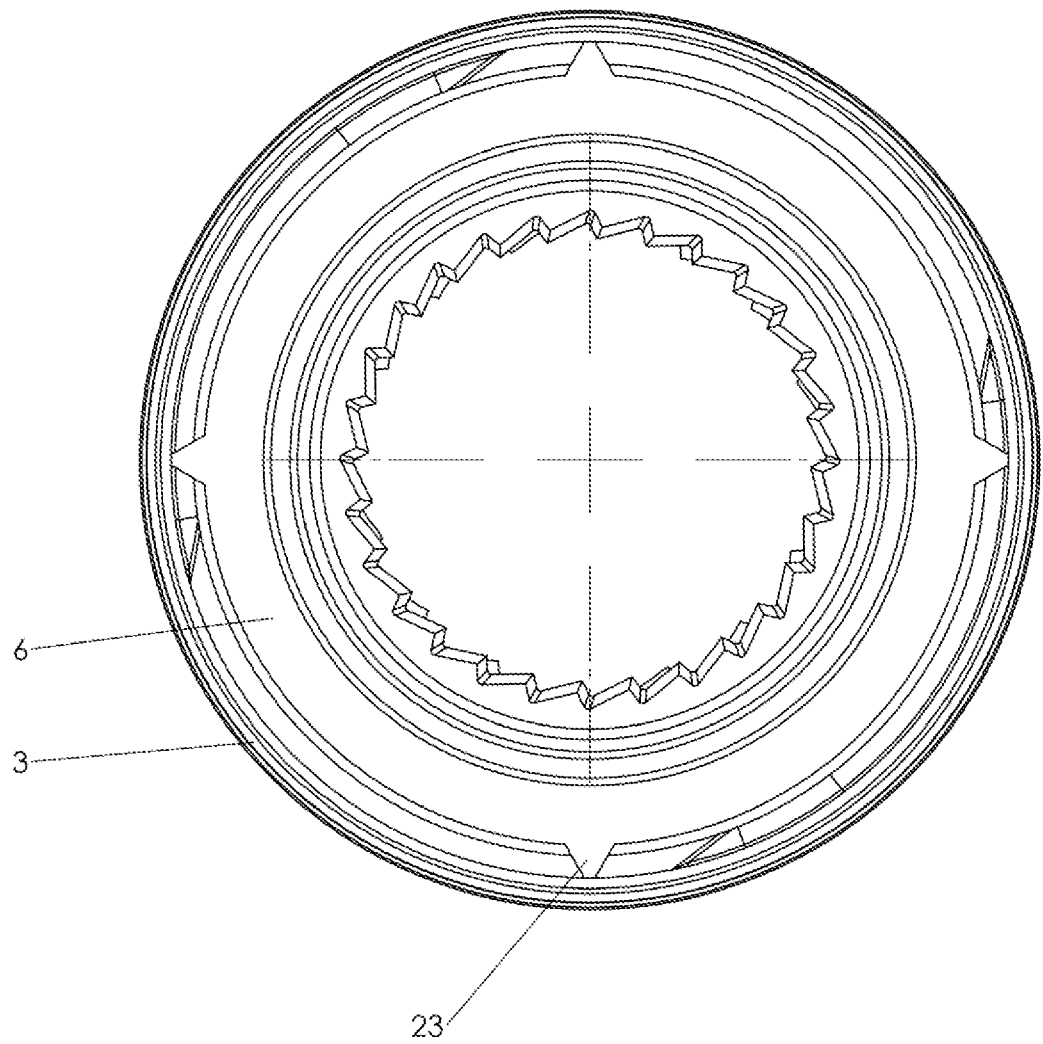
FIG. 4 shows schematically, in a plan view, a stator and an adjusting element of a grinder in accordance with the invention.

FIG. 4 shows a plan view of the stator 6 and the adjusting element 3. In this form of embodiment, the adjusting element 3 and the stator 6 are produced as a connected part. Here the connection is made by way of four thin-walled connecting elements 23, designed with predetermined fracture points, which here are arranged in a regularly distributed manner over the circumference. In the course of assembly on the container 9, these connecting elements 23 fracture, and the stator 6 and the adjusting element 3 are separated from each other.

Figure 5:
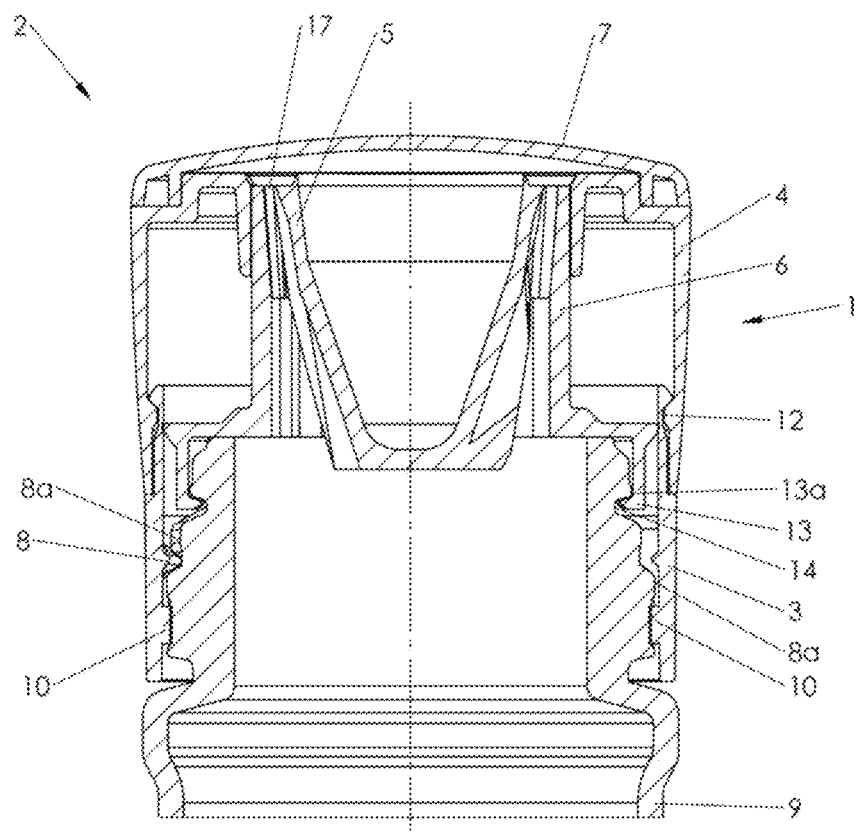
FIG. 5 shows schematically, in a sectional view, a form of embodiment of a spice mill in accordance with the invention, in the "fine" fineness of grinding.

FIG. 5 shows an upper section of the form of embodiment of the spice mill 2 from the preceding figures, consisting of the grinder 1 and the container 9 in the "fine" grinding position, wherein only some sections of the container 9 are shown, and in the lower section, which is not shown, the jacket surface continues in the conventional manner and opens into a closed bottom surface.

Figure 6:
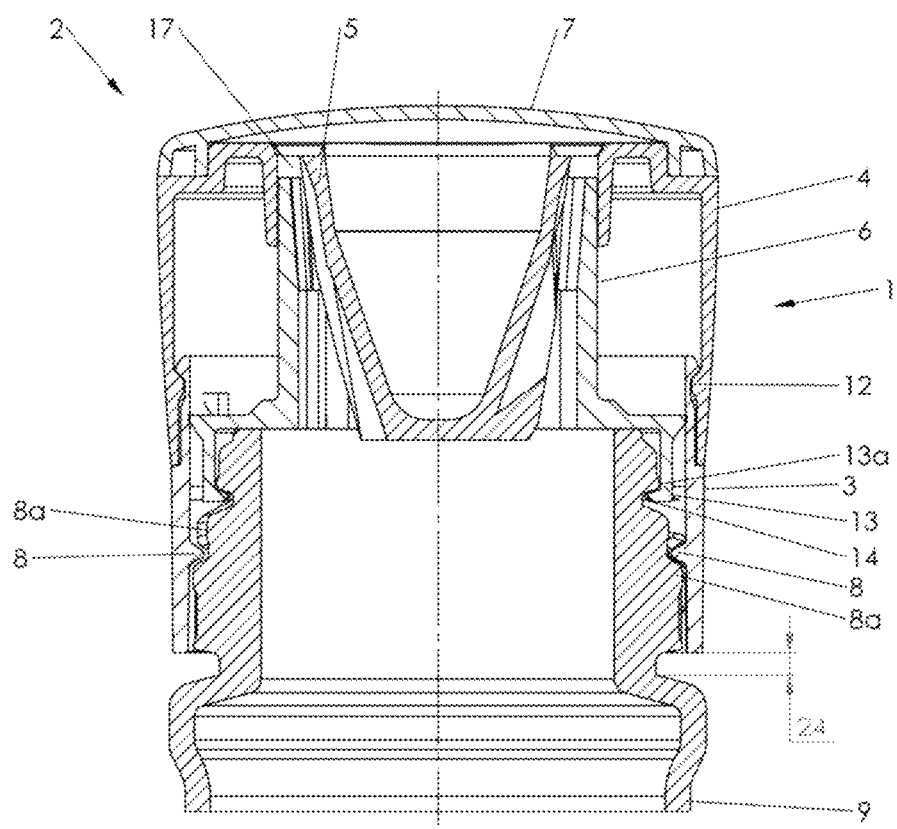
FIG. 6 shows schematically, in a sectional view, a form of embodiment of the spice mill in accordance with the invention, in the "coarse" fineness of grinding.

A comparison of the views of FIG. 5 and FIG. 6 illustrates in particular the interaction of the adjusting element 3 of the grinder 1 with the container 9. The stator 6 is secured against axial movement relative to the container 9 by snap-on hooks 13 which engage in the snap-on groove 14 of the container 9. The snap-on hooks 13 are designed as L-shaped elements, wherein a projection 13a directed in the direction of the container 9 engages in the snap-on groove 14 in each case. Furthermore, the engagement of the thread 8 of the adjusting element 3 in the mating thread 8a of the container 9 can be seen. FIG. 5 also shows a sectional view of the cams 10 of the adjusting element 3, which are located between the run-up surfaces 19b and the first cams 20 of the container 9.

FIG. 6 shows the spice mill 2 from FIG. 5 in the "coarse" grinding position. In comparison to the illustration in FIG. 5 the adjusting element 3 is rotated and is located in a higher position by the distance 24. By the coupling of the axial movement of the adjusting element 3 and the actuating element 4a, the actuating unit 4, and thus also the rotor 5, are similarly raised by the distance 24. By virtue of the substantially immovable connection of the stator 6 to the container 9 in the direction of the longitudinal axis 18, the stator 6 remains in its position and the grinding gap 17 increases.

Figure 7:
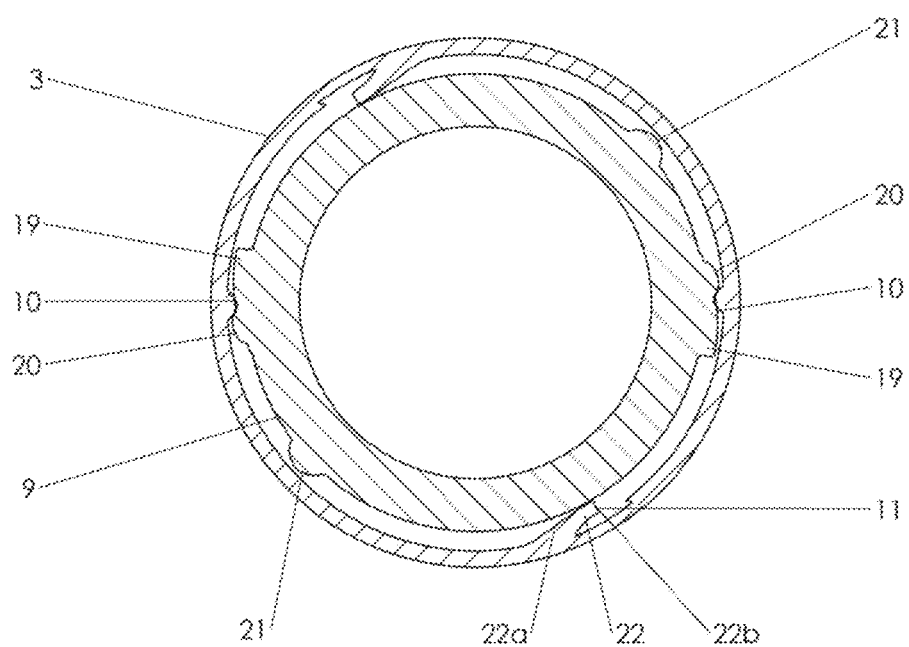
FIG. 7 shows schematically a sectional view transverse to the longitudinal axis of the spice mill in accordance with the invention at the level of the cams, in the "fine" fineness of grinding.
Figure 8:
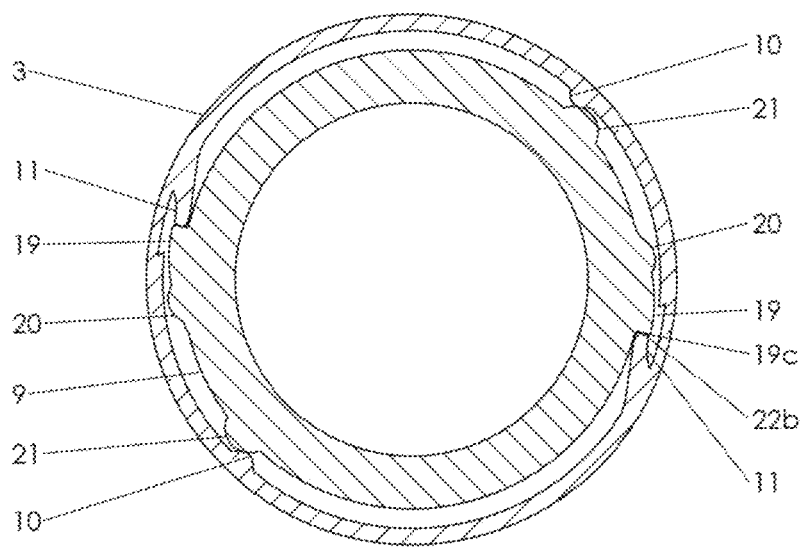
FIG. 8 shows a schematically a sectional view transverse to the longitudinal axis of the spice mill in accordance with the invention at the level of the cams, in the "coarse" fineness of grinding.

FIGS. 7 and 8 show a sectional view transverse to the longitudinal axis 18 at the height of the cams 10, 20, 21 and the adjusting elements 11, 19, through the container 9 and the adjusting element 3.

FIG. 7 shows the sectional view of the mill 2 in the "fine" grinding position. It can be seen that the cams 10 of the adjusting element 3 are latched in place between the first cams 20 and the anti-reverse rotation elements 19 of the container 9. In order to move the cams 10 out of this position, an increased rotational force is required. In FIG. 7, the design of the anti-reverse rotation element 11 can also be recognised as a spring element 22 projecting in the direction of the container. In the course of assembly, the spring element 22 is elastically deformed by the cams 20, 21 and the anti-reverse rotation element 19, and can thus pass the latter. In a similar manner to the anti-reverse rotation element 19 on the container 9, the spring element 22 comprises a run-up surface 22a and a balking surface 22b. This makes it possible to unscrew the adjusting element 3 from the container 9 only to the extent until the balking surfaces 19c, 22b make contact with each other.

FIG. 8 shows the sectional view of the mill 2 transverse to the longitudinal axis 18 in the "coarse" grinding position. Here the balking surfaces 19c, 22b of the anti-reverse rotation elements 19, 11 of the container 9 and the adjusting element 3 are in contact, such that no further unscrewing of the adjusting element 3 is possible. Here the cams 10 of the adjusting element 3 are in contact with the second cams 21 of the container, such that for a rotation of the adjusting element 3 in the direction of the "fine" grinding position in FIG. 7, an increased rotational force must be applied until the cams 10 snap over the cams 21. In this manner, the adjusting element 3 is arranged in a defined position on the container 9.

What is claimed is:

1. A spice mill comprising:
   a container and a grinder, the grinder having a stator removably connected to the container;
   and an actuator having a rotor;
   wherein a position of the stator in a connected state is substantially defined in a direction of a longitudinal axis of the grinder in relation to the container;
   wherein
      the rotor is at least partially arranged within the stator, and the rotor is mounted rotatably in relation to the stator;
   wherein
      the rotor is connected to an actuating element for conjoint rotation;
   wherein
      the actuating element is rotatably connected to an adjusting element, and the actuating element is secured in the direction of the longitudinal axis;
   wherein
      the adjusting element having a thread removably connected to a mating of the container, such that a position of the rotor in the direction of the longitudinal axis is adjusted by a rotation of the adjusting element in relation to the container.

2. The spice mill according to claim 1, wherein:
the adjusting element and the container have interacting anti-reverse rotation elements, such that the adjusting element screwed onto the container cannot be detached from the container without being destroyed.

3. The spice mill according to claim 1, wherein:
the container has, as an anti-reverse rotation element, a ramp-shaped projection having a run-up surface and a balking surface, and the adjusting element has, as an anti-reverse rotation element, a spring element projecting in the direction of the container;
wherein
when the adjusting element is screwed onto the container, the spring element is elastically deformed over the run-up surface, and the spring element slides over the projection, such that the spring element bears against the balking surface in a balking manner in case a rotational movement counter to the screwing-on direction.

4. The spice mill according to claim 1, wherein:
the adjusting element has, on an inner face, a first cam projecting inwards in a direction of the container.

5. The spice mill according to claim 4, wherein:
a first outwardly projecting cam, directly adjoining a flank of the mating thread, is provided on an outer face of the container.

6. The spice mill according to claim 5, wherein:
in addition to first outwardly projecting cam a second cam is provided on an outer face of the container, and the first and the second cam are arranged spaced apart from each other in a screwing-on direction.

7. The spice mill according to claim 6, wherein:
in a second rotational orientation of the adjusting element, the cam of the adjusting element bears against the second cam of the container;
the container and the adjusting element each having at least one anti-reverse rotation element,
wherein said anti-reverse rotation elements bear against each other.

8. The spice mill according to claim 6, wherein:
the adjusting element has the first and second cams associated with a rotational orientation to the first and the second cam of the container, wherein
the first cam of the container and the adjusting element interact and the second cam of the container and the adjusting element interact wherein the first and second cam of the container and the first second cam of the adjusting element are arranged diametrically opposed to each other.

9. The spice mill according to claim 5, wherein:
in a first rotational orientation of the adjusting element the at least one cam of the adjusting element bears against the first cam of the container;
wherein
when an increased rotational force is applied, the adjusting element is elastically deformable, such that the cam of the adjusting element moves over the first cam of the container.

10. The spice mill according to claim 1, wherein:
the container having a circumferential snap-on groove, in an upper end section adjacent to an upper container opening.

11. The spice mill according to claim 10, wherein:
the stator has a bottom side with an outer circumference wherein a plurality of snap-on hooks is distributed over the outer circumference, for purposes of connection to the snap-on groove of the container.

12. The spice mill according to claim 10, wherein:
the upper container opening has a circumference and adjacent to the upper container opening, the container has a plurality of projections, distributed over the circumference.

13. The spice mill according to claim 12, wherein:
the stator having a plurality of projections, distributed over a circumference, for purposes of interaction with the plurality of projections of the container.

* * * * *